US012506659B2

(12) United States Patent
Liu (10) Patent No.: US 12,506,659 B2
(45) Date of Patent: Dec. 23, 2025

(54) BARE METAL DETECTION METHOD AND SYSTEM, AND RELATED COMPONENT

(71) Applicant: INSPUR SUZHOU INTELLIGENT TECHNOLOGY CO., LTD., Jiangsu (CN)

(72) Inventor: Yuanfeng Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 207 days.

(21) Appl. No.: 18/281,292

(22) PCT Filed: Jan. 27, 2022

(86) PCT No.: PCT/CN2022/074373
§ 371 (c)(1),
(2) Date: Sep. 9, 2023

(87) PCT Pub. No.: WO2023/050666
PCT Pub. Date: Apr. 6, 2023

(65) Prior Publication Data
US 2024/0154874 A1 May 9, 2024

(30) Foreign Application Priority Data
Sep. 30, 2021 (CN) .......................... 202111156309.6

(51) Int. Cl.
*H04L 41/0895* (2022.01)
*H04L 41/0806* (2022.01)
(Continued)

(52) U.S. Cl.
CPC ...... *H04L 41/0895* (2022.05); *H04L 41/0806* (2013.01); *H04L 43/0876* (2013.01); *H04L 49/70* (2013.01)

(58) Field of Classification Search
None
See application file for complete search history.

(56) References Cited

U.S. PATENT DOCUMENTS

2016/0011882 A1* 1/2016 Johnson ............... G06F 8/61
713/2
2018/0307643 A1* 10/2018 Zhang ............... G06F 13/4068
(Continued)

FOREIGN PATENT DOCUMENTS

CN 101309169 A 11/2008
CN 104410530 A * 3/2015
(Continued)

*Primary Examiner* — Tonia L Dollinger
*Assistant Examiner* — Ishrat Rashid
(74) *Attorney, Agent, or Firm* — IPro, PLLC (57) ABSTRACT

The present disclosure discloses a bare metal hardware detection method, system and device and a computer readable storage medium, applied to a bare metal node. The bare metal node includes a bare metal provided with a network card. The bare metal detection method includes: when a detecting instruction is received, generating a detecting flow, the detecting flow including an address request; sending the detecting flow to a control node by means of the network card, so that the control node returns add ressin formation when detecting the address request in the detecting flow, the address information including a tftp server address; and obtaining a memory file system according to the tftp server address, acquiring hardware information of the bare metal by means of the memory file system, and reporting the hardware information to the control node.

17 Claims, 3 Drawing Sheets

(51) Int. Cl.
*H04L 43/0876* (2022.01)
*H04L 49/00* (2022.01)

(56) References Cited

U.S. PATENT DOCUMENTS

2020/0257519 A1* 8/2020 Shen .......................... G06F 8/63
2020/0314006 A1* 10/2020 Mackie .............. H04L 12/4633

FOREIGN PATENT DOCUMENTS

| | | | |
|---|---|---|---|
| CN | 104767649 A | 7/2015 | |
| CN | 106888258 A | 6/2017 | |
| CN | 109445801 A | 3/2019 | |
| CN | 110495136 A | 11/2019 | |
| CN | 110532065 A | 12/2019 | |
| CN | 111124437 A | 5/2020 | |
| CN | 111324496 A | 6/2020 | |
| CN | 111901177 A | 11/2020 | |
| CN | 113612667 A | 11/2021 | |
| WO | WO-2016091690 A1 * | 6/2016 | ............. H04L 67/10 |
| WO | 2019084853 A1 | 5/2019 | |

* cited by examiner

BARE METAL DETECTION METHOD AND SYSTEM, AND RELATED COMPONENT

CROSS-REFERENCE TO RELATED APPLICATION

This application claims the priority of the Chinese Patent application filed on Sep. 30, 2021 before the China National Intellectual Property Administration with the application number of 202111156309.6, and the title of "METHOD FOR DETECTING BARE METAL, SYSTEM AND RELATED COMPONENT", which is incorporated herein in its entirety by reference.

FIELD

The present disclosure relates to the field of bare metals, and particularly, to a method for detecting a bare metal, a system and a related component.

BACKGROUND

With the rapid development of the field of cloud computing, bare metal servers are physical servers that have not yet been installed with an operating system. The bare metal servers may provide exclusive cloud physical servers for individuals or enterprises, provide excellent computing performance for key application systems, high-performance computation, big data, core databases, and other services, and ensure data security. Both creating a bare metal cloud physical machine and creating a virtual machine need to designate required hardware requirements, mirror images, required networks, and the like. It is necessary to know hardware information of various bare metals during the creation of the bare metal cloud physical machine, to select bare metals on demand. Therefore, it is very important to detect hardware information of bare metals, but there is currently no solution for detecting hardware information of bare metals.

SUMMARY

The object of the present disclosure is to provide a method for detecting hardware of a bare metal, a system, an apparatus and a computer-readable storage medium, which may detect hardware information of a bare metal and report the hardware information to a control node, so that a user creates a bare metal cloud physical machine according to the hardware information, counted by the control node, of the bare metal.

In order to solve the technical solution, the present disclosure provides a method for detecting hardware of a bare metal, applied to a bare metal node, wherein the bare metal node includes a bare metal installed with a network interface card, and the method for detecting the bare metal includes:

in a case of receiving a detecting instruction, generating a detecting flow, wherein the detecting flow includes an address request;

transmitting the detecting flow to a control node through the network interface card, so that the control node returns address information in a case of detecting the address request in the detecting flow, wherein the address information includes a trivial file transfer protocol (tftp)-server address; and obtaining a memory file system according to the tftp-server address, collecting hardware information of the bare metal through the memory file system, and reporting the hardware information to the control node.

In some embodiments, the process of transmitting the detecting flow to the control node through the network interface card includes:

transmitting the detecting flow to the control node through the network interface card after labeling the detecting flow with a first label;

the method for detecting the hardware further includes:

identifying, by the control node, the detecting flow among all flows according to the first label.

In some embodiments, the address information further includes a multiple access channel (mac) address;

before obtaining the memory file system according to the tftp-server address, the method for detecting the hardware further includes:

detecting whether the mac address in the address information is a native mac address; and in a case that the mac address in the address information is not the native mac address, discarding the address information;

the process of obtaining the memory file system according to the tftp-server address includes:

in a case that the mac address in the address information is the native mac address, obtaining the memory file system according to the tftp-server address.

In some embodiments, the process of collecting the hardware information of the bare metal through the memory file system includes:

collecting the hardware information of the bare metal through an ironic python agent (IPA) service program of the memory file system.

In some embodiments, the method for detecting the hardware further includes:

collecting hardware information of the network interface card through a rshim service program of a peripheral component interconnect (PCI), and uploading the hardware information of the network interface card to the control node.

In some embodiments, the address information is address information with a second label.

In some embodiments, the network interface card is configured with a first flow table, and the control node is configured with a second flow table;

the process of transmitting the detecting flow to the control node through the network interface card includes:

transmitting the detecting flow to a target position of the control node according to the first flow table and the second flow table.

In order to solve the technical solution, the present disclosure further provides a system for detecting hardware of a bare metal, applied to a bare metal node, wherein the bare metal node includes a bare metal installed with a network interface card, and the system for detecting the bare metal includes:

a flow generation module, configured to: in a case of receiving a detecting instruction, generate a detecting flow, wherein the detecting flow includes an address request;

a transmission module, configured to: transmit the detecting flow to a control node through the network interface card, so that the control node returns address information in a case of detecting the address request in the detecting flow, wherein the address information includes a tftp-server address;

a collecting module, configured to: obtain a memory file system according to the tftp-server address, and collect hardware information of the bare metal through the memory file system; and an uploading module, configured to report the hardware information to the control node.

In some embodiments, the address information further includes a mac address; the system for detecting the hardware further includes:

a detection module, configured to: detect whether the mac address in the address information is a native mac address; in a case that the mac address in the address information is not the native mac address, discard the address information; and in a case that the mac address in the address information is the native mac address, trigger the collecting module; and the collecting module is configured to: in a case that the mac address in the address information is the native mac address, obtain the memory file system according to the tftp-server address, and acquire the hardware information of the bare metal through the memory file system.

In order to solve the technical solution, the present disclosure further provides an apparatus for detecting the hardware of the bare metal, including:

a memory, configured to store a computer program; and
a processor, configured to, when executing the computer program, implement the steps of the method for detecting the hardware of the bare metal according to any one of embodiments stated above.

In order to solve the technical solution, the present disclosure further provides a computer-readable storage medium, wherein the computer-readable storage medium stores a computer program; and the computer program, when executed by a processor, implements the steps of the method for detecting the hardware of the bare metal according to any one of embodiments stated above.

The present disclosure provides a method for detecting hardware of a bare metal. The bare metal establishes a communication connection with a control node through a network interface card. When hardware information of a certain bare metal node needs to be detected, the bare metal generates a detecting flow with an address request, and transmits the detecting flow to the control node through the network interface card; the control node provides a tftp-server address for the bare metal according to the identified address request; and the bare metal obtains a memory file system according to the received tftp-server address, and may detect the hardware information of the bare metal through the memory file system and report the hardware information to the control node, so that a user creates a bare metal cloud physical machine according to the hardware information, counted by the control node, of the bare metal. The present disclosure further provides a system and an apparatus for detecting hardware of a bare metal, and a computer-readable storage medium, which have the same beneficial effects as the above method for detecting the hardware of the bare metal.

BRIEF DESCRIPTION OF THE DRAWINGS

In order to explain the embodiments of the present disclosure more clearly, a brief description may be given below with reference to the accompanying drawings which are used in the description of the embodiments, and it is obvious that the drawings in the description below are merely some embodiments of the present disclosure, and a person skilled in the art may obtain other drawings according to the provided drawings without involving any inventive effort.

DETAILED DESCRIPTION

The core of the present disclosure is to provide a method for detecting hardware of a bare metal, a system and an apparatus and a computer-readable storage medium, which may detect hardware information of a bare metal and report the hardware information to a control node, so that a user creates a bare metal cloud physical machine according to the hardware information, counted by the control node, of the bare metal.

In order to make the objects, the technical solutions and the advantages of the embodiments of the present disclosure clearer, the technical solutions according to the embodiments of the present disclosure may be clearly and completely described below with reference to the drawings according to the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be first noted that an Overlay network is a virtual network established on an existing physical network, and has independent control and forwarding planes. For a terminal device (such as a server) connected to the Overlay, the physical network is transparent, thereby separation of a bearer network and a service program network may be achieved. For virtual machines of an openstack (which is an open-source cloud computing management platform project), they share resources that occupy computing nodes, but the computing nodes are not exposed to a final user. Therefore, a tunnel may be deployed at the computing node to achieve encapsulation and de-encapsulation of an Overlay of the virtual machines. However, for a bare metal scenario, a bare metal only occupies one computing node. The computing node needs to be completely exposed to the final user. Therefore, the virtual machine Overlay implementation for deploying a tunnel at the computing node may not be applied to the bare metal scenario.

At present, there are two mainstream implementation schemes for the Overlay of the bare metal: First, performing encapsulation and de-encapsulation of the Overlay on messages getting in and out of the bare metal on the physical exchange by using a hard software defined network (SDN), namely, by controlling a physical exchange; and second, performing encapsulation and de-encapsulation on messages getting in and out of the bare metal in an operating system of a smart network interface card by using a soft SDN under the help of the smart network interface card.

How to implement detection of hardware of a bare metal is a very important step in the scheme of achieving the Overlay of the bare metal with the help of the smart network interface card. A method for detecting hardware of a bare metal provided by the present disclosure will be described in detail below.

Figure 1:
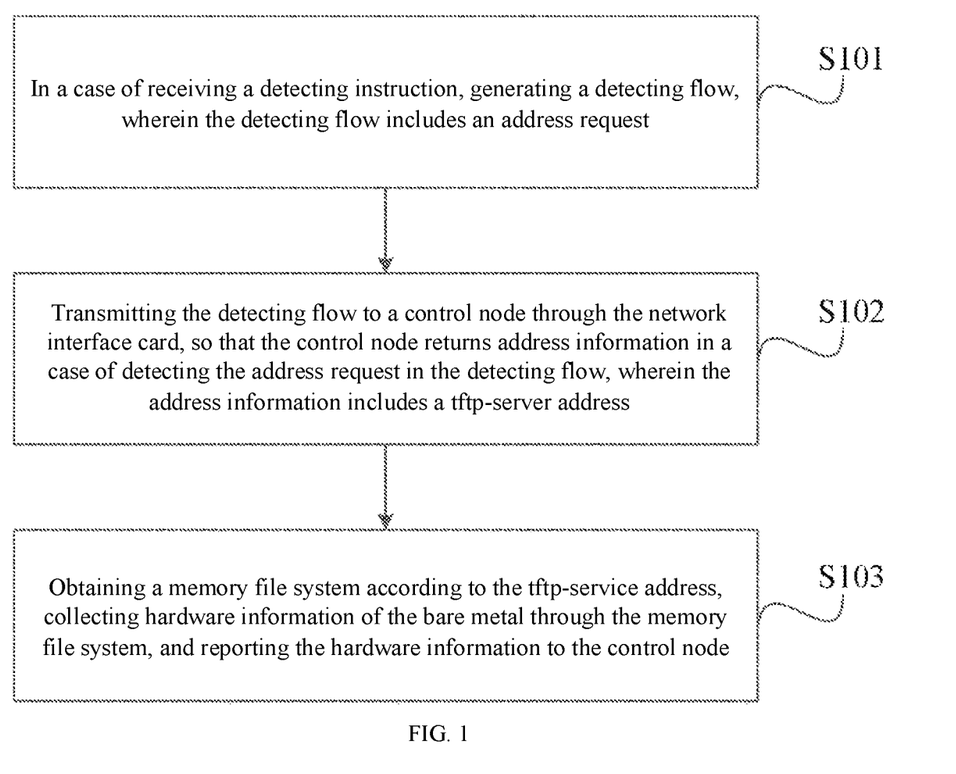
FIG. 1 is a flowchart of steps of a method for detecting hardware of a bare metal provided by the present disclosure.

Referring to FIG. 1, FIG. 1 is a flowchart of steps of a method for detecting hardware of a bare metal provided by the present disclosure. The method for detecting the hardware includes:

S101: in a case of receiving a detecting instruction, generating a detecting flow, wherein the detecting flow includes an address request.

Figure 2:
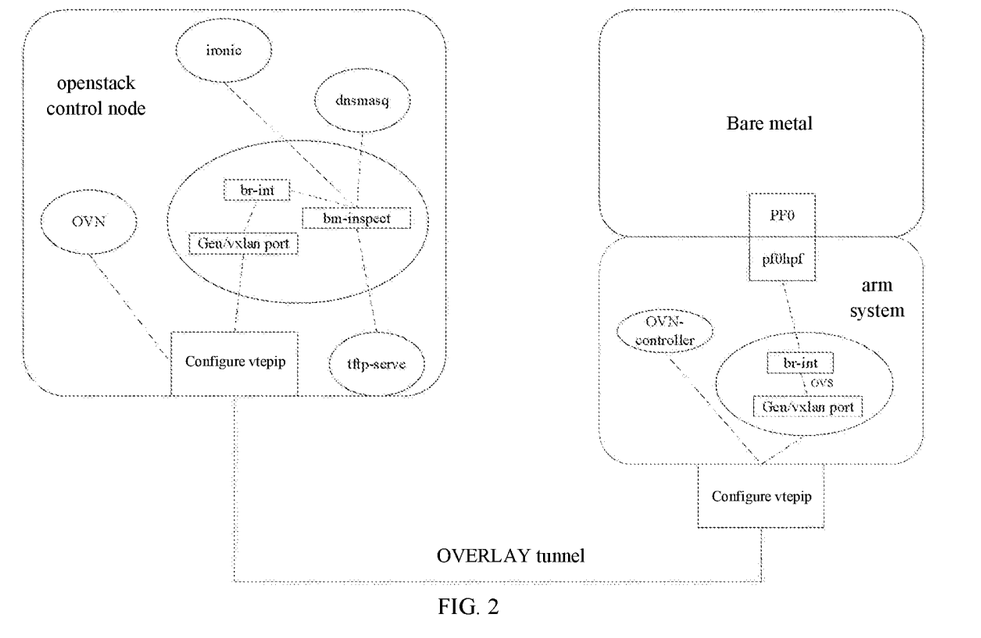
FIG. 2 is a schematic diagram of an architecture for detecting a bare metal provided by the present disclosure.

Before this scheme is implemented, it is necessary to deploy a control node and a bare metal node separately. An openstack including a neutron ironic nova component is installed at an openstack control node, and an open virtual network (OVN) and an open virtual switch (OVS) are installed and deployed. An OVS internal port and a bm-inspect port (namely, a metal inspection port) are created on a network bridge br-int of the openstack control node; dnsmasq of an inspection network is configured to monitor the bm-inspect; a trivial file transfer protocol (tftp)-server is configured to monitor the bm-inspect port; and the tftp-server provides a memory mirror image and file system of a bare metal inspection stage. The openstack is an open source infrastructure project of cloud computing, and ironic is a bare metal server in the openstack and is mainly configured to manage and deploy a bare metal. In the present embodiment, the bare metal is installed with a network interface card, and an advanced risc machines (arm) operating system is installed on the network interface card. When the network interface card is plugged into the bare metal node, the network interface card may generate a port PF0 on the system of the bare metal. Similarly, in the arm operating system of the smart network interface card, there may also be a port corresponding to the port PF0 of the system of the bare metal, the port is pf0hpf, as shown in FIG. 2. After the system of the network interface card is powered on, the network interface card is set to be in an embedded CPU physical function (ECPF) mode, and an OVN-controller and the OVS are deployed. The port pf0hpf is added to the br-int network bridge of the OVS; a virtual extensible local area network (vxlan) tunnel between the network interface card and the control node of the openstack is opened; and an OVN-controller server is started. The network interface card may be selected from a bluefield2 smart network interface card introduced by Mellanox.

Further, an inspection network is planned in the network interface card, and a dnsmasq server corresponding to the inspection network is configured on the control node to monitor the address request in the detecting flow. It may be understood that deploying an inspection network is a concept in the ironic. The bare metal may achieve a bare metal inspection process through the inspection network. The inspection network is not managed by the OVN. The dnsmasq is a small-size and convenient tool for configuring a domain name server (DNS) and a dynamic host configuration protocol (dhcp), is suitable for small networks, and provides DNS functions and dhcp functions. In the present embodiment, the dnsmasq is used to provide a dhcp service program for the inspection network.

It may be understood that after the control node initiates a bare metal inspection operation, that is, after receiving the detecting instruction, the bare metal may generate the detecting flow. The detecting flow includes the address request. When receiving the detecting instruction, the bare metal performs pre-boot execution environment (PXE) startup. Here, the detecting flow is a PXE flow which includes a dhcp address request.

S102: transmitting the detecting flow to a control node through the network interface card, so that the control node returns address information in a case of detecting the address request in the detecting flow, wherein the address information includes a tftp-server address.

The detecting flow generated by the bare metal may enter the arm system of the network interface card through the pf0hpf port. The detecting flow is transmitted to the control node through the network interface card. After the control node identifies the detecting flow, the control node transmits the detecting flow to the bm-inspect. The dnsmasq in the control node monitors the flow in the bm-inspect. When it is detected that a preset address request exists in the flow, such as the dhcp address request, the dnsmasq may provide a dhcp address and the tftp-server address, and the control node returns a return flow including the dhcp address and the tftp-server address to the bare metal node.

S103: obtaining a memory file system according to the tftp-server address, collecting hardware information of the bare metal through the memory file system, and reporting the hardware information to the control node.

After receiving the tftp-server address, the bare metal node obtains the memory file system according to the tftp-server address. An ironic python agent (IPA, which is a Python agent configured to revoke and configure a bare metal server) service program in the memory file system may collect the hardware information of the bare metal. The hardware information of the network interface card may be collected through a rshim service program of a peripheral component interconnect (PCI, which is an external controller interface). After all required hardware information is completely collected, the hardware information may be transmitted to the ironic of the control node.

The hardware information includes but is not limited to a central processing unit (CPU), a memory, a hard disk, and other hardware information, as well as a hostname of the smart network interface card and network interface card information of some representor (rep) ports.

It may be seen that in the present embodiment, the bare metal establishes a communication connection with a control node through a network interface card. When hardware information of a certain bare metal node needs to be detected, the bare metal generates a detecting flow with an address request, and transmits the detecting flow to the control node through the network interface card; the control node provides a tftp-server address for the bare metal according to the identified address request; and the bare metal obtains a memory file system according to the received tftp-server address, and may detect the hardware information of the bare metal through the memory file system and report the hardware information to the control node, so that a user creates a bare metal cloud physical machine according to the hardware information, counted by the control node, of the bare metal.

Based on the Above Embodiment

In an embodiment, the process of transmitting the detecting flow to the control node through the network interface card includes:

transmitting the detecting flow to the control node through the network interface card after labeling the detecting flow with a first label.

The method for detecting the hardware further includes:

identifying, by the control node, the detecting flow among all flows according to the first label.

In order to distinguish the inspection network from other networks in the OVN, the present embodiment configures a vxlan network identifier (VNI) for the inspection network, such as 0xFFF, and also configures a label (such as 0xFFF) for an outlet port, so that all flows of the inspection network may be transmitted to the 0xFFF port of the network with the VNI being the 0xFFF network. Therefore, it may be seen that the first label in the present embodiment includes a label of the VNI and a label of the outlet port. Correspondingly, the control node intercepts all the flows with the VNI being the 0xFFF and the outlet port being the 0xFFF and transmits the flows to the bm-inspect.

In an embodiment, the address information also includes a multiple access channel (mac) address.

Before obtaining the memory file system according to the tftp-server address, the method for detecting the hardware further includes:

detecting whether the mac address in the address information is a native mac address; and in a case that the mac address in the address information is not the native mac address, discarding the address information.

The process of obtaining the memory file system according to the tftp-server address includes:

in a case that the mac address in the address information is the native mac address, obtaining the memory file system according to the tftp-server address.

It may be understood that each control node may be connected to a plurality of bare metal nodes, and the control node transmits the address information to all the bare metal nodes connected to the control node. Correspondingly, the address information also includes the mac address. After receiving the address information transmitted by the control node, the bare metal nodes determine, according to the mac address in the address information, whether the address information is address information required by themselves. If yes, the address information is uploaded to the pf0hpf port, so that the bare metal obtains the memory file system according to the tftp-server address. If not, the address information is discarded.

In an embodiment, the address information is address information with a second label.

Further, after the return flow including the address information enters the bm-inspect, the second label may also be labeled on the return flow, and the return flow is then forwarded to all the bare metal nodes. The bare metal nodes in a non-inspection stage do not identify vni 0xfff, and a message is discarded. After the vxlan is de-encapsulated, the bare metal nodes in an inspection stage determine whether messages are their own messages through the mac address, and then transmit the messages to the pf0hpf port.

In an embodiment, the network card is configured with a first flow table, and the control node is configured with a second flow table.

The process of transmitting the detecting flow to the control node through the network interface card includes:

transmitting the detecting flow to a target position of the control node according to the first flow table and the second flow table.

In order to ensure that the detecting flow is guided to the bm-inspect in the control node, the present embodiment also pre-configures two flow tables on the network interface card and the control node separately. When detecting hardware information of a certain bare metal is started, at the bare metal node end, the smart network interface card is set to be in the ECPF mode, the pf0hpf port is added to the br-int network bridge; the OVN-controller server is started; after the OVN-controller on the smart network interface card is powered on and generates the vtep port of the vxlan on the OVS, all the flow tables on the current br-int network bridge are cleared, and the flow table, namely, the first flow table, of the inspection network is issued; and after vni 0xFFF and reg15 0xFFF are labeled on the flows entering from the pf0hpf port, all the flows are sent to the vtep port of the vxlan and then sent to the control node. The entire process described above is fixed in the booting process. For the control node end, a port flow table, namely, the second flow table, of the bm-inspect port is added on the control node of the openstack, so as to intercept all the flows with the VNI being 0xFFF and the output port being 0xFFF, and send the flows to the bm-inspect, namely, the target position in this step. The vni 0xFFF is added to the flows entering from the bm-inspect and is forwarded to all current vtep nodes.

In summary, in the OVN+smart network interface card networking, in order to achieve the collection of the hardware information of the bare metal, the present disclosure has built an inspection network that is not managed by the OVN. Without the management by the OVN, the flow table of the inspection network may be freely changed. By adding the flow table to the smart network interface card of the bare metal, the PXE flow of the bare metal may be led out and sent to a dedicated port for processing through a vxlan tunnel. At the control node end of the openstack, all requests of the inspection network are processed by adding the OVS internal port and the bm-inspect. A VNI is used to achieve complete isolation from other networks of the current OVNs, and a unique bare metal node is determined through the VNI and the mac address.

Figure 3:
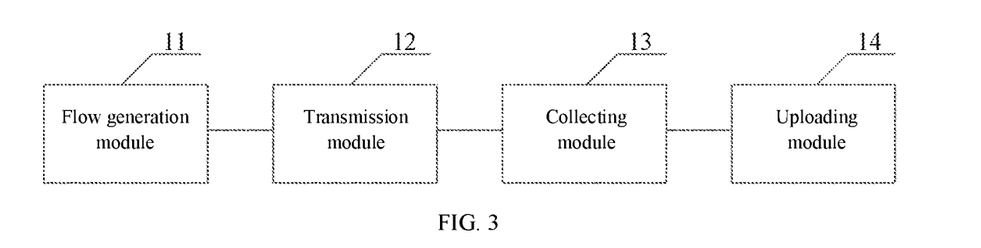
FIG. 3 is a schematic structural diagram of a system for detecting hardware of a bare metal provided by the present disclosure.

Referring to FIG. 3, FIG. 3 is a schematic structural diagram of a system for detecting hardware of a bare metal. The system for detecting the hardware of the bare metal is applied to a bare metal node. The bare metal node includes a bare metal installed with a network interface card, and the system for detecting the bare metal includes:

a flow generation module 11, configured to: in a case of receiving a detecting instruction, generate a detecting flow, wherein the detecting flow includes an address request;

a transmission module 12, configured to: transmit the detecting flow to a control node through the network interface card, so that the control node returns address information in a case of detecting the address request in the detecting flow, wherein the address information includes a tftp-server address;

a collecting module 13, configured to: obtain a memory file system according to the tftp-server address, and collect hardware information of the bare metal through the memory file system; and an uploading module 14, configured to report the hardware information to the control node.

It may be seen that in the present embodiment, the bare metal establishes a communication connection with a control node through a network interface card. When hardware information of a certain bare metal node needs to be detected, the bare metal generates a detecting flow with an address request, and transmits the detecting flow to the control node through the network interface card; the control node provides a tftp-server address for the bare metal according to the identified address request; and the bare metal obtains a memory file system according to the received tftp-server address, and may detect the hardware information of the bare metal through the memory file system and report the hardware information to the control node, so that a user creates a bare metal cloud physical machine according to the hardware information, counted by the control node, of the bare metal.

In an embodiment, the process of transmitting the detecting flow to the control node through the network interface card includes:

transmitting the detecting flow to the control node through the network interface card after labeling the detecting flow with a first label.

The system for detecting the hardware further includes:

an identification module, arranged in the control node and configured to identify the detecting flow among all flows according to the first label.

In an embodiment, the address information also includes a mac address.

Before obtaining the memory file system according to the tftp-server address, the system for detecting the hardware further includes:

a detection module, configured to: detect whether the mac address in the address information is a native mac address; in a case that the mac address in the address information is not the native mac address, discard the address information; and in a case that the mac address in the address information is the native mac address, trigger the collecting module 13. The collecting module 13 is configured to: in a case that the mac address in the address information is the native mac address, obtain the memory file system according to the tftp-server address, and collecting the hardware information of the bare metal through the memory file system.

In an embodiment, the process of collecting the hardware information of the bare metal through the memory file system includes:

collecting the hardware information of the bare metal through an IPA service program of the memory file system.

In an embodiment, the collecting module 13 is further configured to:

collect hardware information of the network interface card through a rshim service program of a PCI, and upload the hardware information of the network interface card to the control node.

In an embodiment, the address information is address information with a second label.

In an embodiment, the network card is configured with a first flow table, and the control node is configured with a second flow table.

The process of transmitting the detecting flow to the control node through the network interface card includes:

transmitting the detecting flow to a target position of the control node according to the first flow table and the second flow table.

Figure 4:
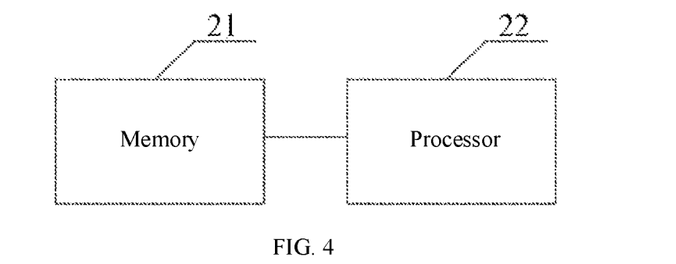
FIG. 4 is a schematic structural diagram of an apparatus for detecting hardware of a bare metal provided by the present disclosure.

Referring to FIG. 4, FIG. 4 is a schematic structural diagram of an apparatus for detecting hardware of a bare metal provided by the present disclosure, including:

a memory 21, configured to store a computer program; and a processor 22, configured to execute the computer program to implement the steps of the method for detecting the hardware of the bare metal described in any one of the above embodiments.

The memory 21 includes a non-volatile storage medium and an internal memory 21. The non-volatile storage medium stores an operating system and a computer-readable instruction. The internal memory 21 provides an environment for running of the operating system and running of the computer-readable instruction in the non-volatile storage medium. When executing the computer program stored in the memory 21, the processor 22 may implement the following steps: in a case of receiving a detecting instruction, generating a detecting flow, wherein the detecting flow includes an address request; transmitting the detecting flow to a control node through a network interface card, so that the control node returns address information in a case of detecting the address request in the detecting flow, wherein the address information includes a tftp-server address; and obtaining a memory file system according to the tftp-server address, collecting the hardware information of the bare metal through the memory file system, and reporting the hardware information to the control node.

In the present embodiment, the bare metal establishes a communication connection with a control node through a network interface card. When hardware information of a certain bare metal node needs to be detected, the bare metal generates a detecting flow with an address request, and transmits the detecting flow to the control node through the network interface card; the control node provides a tftp-server address for the bare metal according to the identified address request; and the bare metal obtains a memory file system according to the received tftp-server address, and may detect the hardware information of the bare metal through the memory file system and report the hardware information to the control node, so that a user creates a bare metal cloud physical machine according to the hardware information, counted by the control node, of the bare metal.

In an embodiment, when executing a computer sub-program stored in the memory 21, the processor 22 may implement the following steps: transmitting the detecting flow to the control node through the network interface card after labeling the detecting flow with a first label; and identifying, by the control node, the detecting flow among all flows according to the first label.

In an embodiment, when executing a computer sub-program stored in the memory 21, the processor 22 may implement the following steps: detecting whether a mac address in the address information is a native mac address; and in a case that the mac address in the address information is not the native mac address, discarding the address information; and in a case that the mac address in the address information is the native mac address, obtaining the memory file system according to the tftp-server address.

In an embodiment, when executing a computer sub-program stored in the memory 21, the processor 22 may implement the following step: collecting the hardware information of the bare metal through an IPA service program of the memory file system.

In an embodiment, when executing a computer sub-program stored in the memory 21, the processor 22 may implement the following steps: collecting hardware information of the network interface card through a rshim service program of a PCI, and uploading the hardware information of the network interface card to the control node.

In an embodiment, when executing a computer sub-program stored in the memory 21, the processor 22 may implement the following step: transmitting the detecting flow to a target position of the control node according to a first flow table configured by the network interface card and a second flow table configured by the control node.

Figure 5:
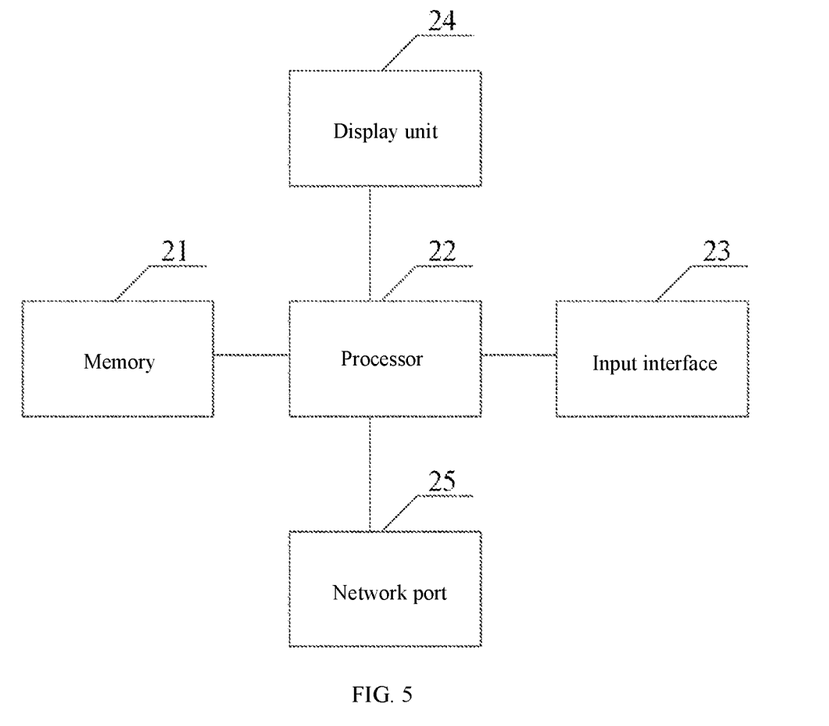
FIG. 5 is a schematic structural diagram of another apparatus for detecting hardware of a bare metal provided by the present disclosure.

Based on the above embodiment, as an implementation, referring to FIG. 5, FIG. 5 is a structural diagram of another apparatus for detecting hardware of a bare metal. The apparatus for detecting the hardware of the bare metal further includes:

an input interface 23, connected to the processor 22 and configured to obtain an externally imported computer program, parameters, and instructions which are controlled by the processor 22 to be stored in the memory 21. The input interface 23 may be connected to an input apparatus and receive parameters or instructions manually input by a user. The input apparatus may be a touch layer covered on a display screen, or a key, a trackball or touchpad arranged on a terminal housing.

The apparatus further includes a display unit 24, connected to the processor 22 and configured to display data transmitted by the processor 22. The display unit 24 may be a liquid crystal display screen, an e-ink display screen, or the like.

The apparatus further includes a network port 25, connected to the processor 22 and configured to perform communication connection with the external terminal devices. A communication technology used in the communication connection may be a wired communication technology or a wireless communication technology, such as a mobile high-definition link (MHL), a universal serial bus (USB), a high-definition multimedia interface (HDMI), a wireless fidelity technology (WiFi), a Bluetooth communication technology, a low-power Bluetooth communication technology, and an IEEE802.11s-based communication technology.

On the other hand, the present disclosure further provides a computer-readable storage medium. The storage medium may include various media that may store program codes, such as a USB flash disk, a mobile hard disk, a read-only memory (ROM), a random access memory (RAM), a magnetic disc, or a compact disc. The storage medium stores a computer program thereon. When executed by a processor, the computer program implements the following steps: in a case of receiving a detecting instruction, generating a detecting flow, wherein the detecting flow includes an address request; transmitting the detecting flow to a control node through a network interface card, so that the control node returns address information in a case of detecting the address request in the detecting flow, wherein the address information includes a tftp-server address; and obtaining a memory file system according to the tftp-server address, collecting hardware information of the bare metal through the memory file system, and reporting the hardware information to the control node.

In the present embodiment, the bare metal establishes a communication connection with a control node through a network interface card. When hardware information of a certain bare metal node needs to be detected, the bare metal generates a detecting flow with an address request, and transmits the detecting flow to the control node through the network interface card; the control node provides a tftp-server address for the bare metal according to the identified address request; and the bare metal obtains a memory file system according to the received tftp-server address, and may detect the hardware information of the bare metal through the memory file system and report the hardware information to the control node, so that a user creates a bare metal cloud physical machine according to the hardware information, counted by the control node, of the bare metal.

In an embodiment, when executed by the processor, a computer program stored in the computer-readable storage medium may implement the following steps: transmitting the detecting flow to the control node through the network interface card after labeling the detecting flow with a first label; and identifying, by the control node, the detecting flow among all flows according to the first label.

In an embodiment, when executed by the processor, a computer program stored in the computer-readable storage medium may implement the following steps: detecting whether a mac address in the address information is a native mac address; and in a case that the mac address in the address information is not the native mac address, discarding the address information; and in a case that the mac address in the address information is the native mac address, obtaining the memory file system according to the tftp-server address.

In an embodiment, when executed by the processor, a computer program stored in the computer-readable storage medium may implement the following step: collecting the hardware information of the bare metal through an IPA service program of the memory file system.

In an embodiment, when executed by the processor, a computer program stored in the computer-readable storage medium may implement the following steps: acquiring hardware information of the network interface card through a rshim service program of a PCI, and uploading the hardware information of the network interface card to the control node.

In an embodiment, when executed by the processor, a computer program stored in the computer-readable storage medium may implement the following step: transmitting the detecting flow to a target position of the control node according to a first flow table configured by the network interface card and a second flow table configured by the control node.

It should also be noted that the relational terms such as "first" and "second" in the present specification are used solely to distinguish one entity or operation from another entity or operation without necessarily requiring or implying any actual such relationship or order between such entities or operations. Furthermore, the terms like "include", "include", or any other variations thereof, are intended to indicate a non-exclusive inclusion, such that a process, method, article, or apparatus that includes a list of elements does not include only those elements but may include other elements not expressly listed or inherent to such process, method, article, or apparatus. An element defined by a phrase like "includes a . . . " does not, without further constraints, preclude the existence of additional identical elements in the process, method, article, or apparatus that includes the element.

The foregoing description of the disclosed embodiments enables those skilled in the art to realize or use the present disclosure. A variety of modifications of these embodiments may be obvious to those skilled in the art, and the general principles defined herein may be implemented in other embodiments without departing from the spirit or scope of the present disclosure. Accordingly, the present disclosure may not be limited to these embodiments shown herein, but may conform to the widest range consistent with the principles and novel features disclosed herein.

The invention claimed is:

1. A method for detecting hardware of a bare metal, applied to a bare metal node, wherein the bare metal node comprises a bare metal installed with a network interface card, and the method for detecting the bare metal comprises:

in response to receiving a detecting instruction, generating a detecting flow, wherein the detecting flow comprises an address request;

transmitting the detecting flow to a control node through the network interface card, thereby causing that the control node returns address information in response to detecting the address request in the detecting flow, wherein the address information comprises a trivial file transfer protocol (tftp)-server address; and obtaining a memory file system according to the tftp-server address, collecting hardware information of the bare metal through the memory file system, and reporting the hardware information to the control node; and wherein the address information further comprises a multiple access channel (mac) address;

before obtaining the memory file system according to the tftp-server address, the method for detecting the hardware further comprises:

detecting whether the mac address in the address information is a native mac address; and in response to that the mac address in the address information is not the native mac address, discarding the address information;

the process of obtaining the memory file system according to the tftp-server address comprises:

in response to that the mac address in the address information is the native mac address, obtaining the memory file system according to the tftp-server address.

2. The method for detecting the hardware of the bare metal according to claim 1, wherein the process of transmitting the detecting flow to the control node through the network interface card comprises:

transmitting the detecting flow to the control node through the network interface card after labeling the detecting flow with a first label;

the method for detecting the hardware further comprises:

identifying, by the control node, the detecting flow among all flows according to the first label.

3. The method for detecting the hardware of the bare metal according to claim 1, wherein the process of collecting the hardware information of the bare metal through the memory file system comprises:

collecting the hardware information of the bare metal through an ironic python agent (IPA) service program of the memory file system.

4. The method for detecting the hardware of the bare metal according to claim 1, wherein the method for detecting the hardware further comprises:

collecting hardware information of the network interface card through a rshim service program of a peripheral component interconnect (PCI), and uploading the hardware information of the network interface card to the control node.

5. The method for detecting the hardware of the bare metal according to claim 1, wherein the address information is address information with a second label.

6. The method for detecting the hardware of the bare metal according to claim 1, wherein the network interface card is configured with a first flow table, and the control node is configured with a second flow table;

the process of transmitting the detecting flow to the control node through the network interface card comprises:

transmitting the detecting flow to a target position of the control node according to the first flow table and the second flow table.

7. An apparatus for detecting the hardware of the bare metal, comprising:

a memory, configured to store a computer program; and a processor, configured to, when executing the computer program, implement the steps of the method for detecting the hardware of the bare metal according to claim 1.

8. A non-transitory computer-readable storage medium, wherein the computer-readable storage medium stores a computer program; and the computer program, when executed by a processor, implements the steps of the method for detecting the hardware of the bare metal according to claim 1.

9. The method for detecting the hardware of the bare metal according to claim 1, wherein before the step of in response to receiving the detecting instruction, generating the detecting flow, wherein the detecting flow comprises the address request, the method for detecting the hardware of the bare metal further comprises:

deploying a control node and a bare metal node separately;

installing an openstack at an openstack control node; and installing and deploying an open virtual network (OVN) and an open virtual switch (OVS).

10. The method for detecting the hardware of the bare metal according to claim 9, wherein the openstack comprises a neutron ironic nova component.

11. The method for detecting the hardware of the bare metal according to claim 1, wherein before the step of in response to receiving the detecting instruction, generating the detecting flow, wherein the detecting flow comprises the address request, the method for detecting the hardware of the bare metal further comprises:

creating an OVS internal port and a metal inspection port on a network bridge of a openstack control node;

configuring dnsmasq of an inspection network to monitor metal inspection;

configuring the tftp-server to monitor the metal inspection port;

wherein the tftp-server provides a memory mirror image and a file system of a bare metal inspection stage; the dnsmasq is a tool for configuring a domain name server (DNS) and a dynamic host configuration protocol (dhcp).

12. The apparatus for detecting the hardware of the bare metal according to claim 7, wherein transmitting the detecting flow to the control node through the network interface card comprises:

transmitting the detecting flow to the control node through the network interface card after labeling the detecting flow with a first label;

the method for detecting the hardware further comprises:

identifying, by the control node, the detecting flow among all flows according to the first label.

13. The apparatus for detecting the hardware of the bare metal according to claim 7, wherein the process of collecting the hardware information of the bare metal through the memory file system comprises:

collecting the hardware information of the bare metal through an ironic python agent (IPA) service program of the memory file system.

14. The apparatus for detecting the hardware of the bare metal according to claim 7, wherein the method for detecting the hardware further comprises:

collecting hardware information of the network interface card through a rshim service program of a peripheral component interconnect (PCI), and uploading the hardware information of the network interface card to the control node.

15. The apparatus for detecting the hardware of the bare metal according to claim 7, wherein the address information is address information with a second label.

16. The apparatus for detecting the hardware of the bare metal according to claim 7, wherein the network interface card is configured with a first flow table, and the control node is configured with a second flow table;
    the process of transmitting the detecting flow to the control node through the network interface card comprises:
    transmitting the detecting flow to a target position of the control node according to the first flow table and the second flow table.

17. The non-transitory computer-readable storage medium according to claim 8, wherein transmitting the detecting flow to the control node through the network interface card comprises:
    transmitting the detecting flow to the control node through the network interface card after labeling the detecting flow with a first label;
    the method for detecting the hardware further comprises:
    identifying, by the control node, the detecting flow among all flows according to the first label.

\* \* \* \* \*